United States Patent [19]
Sessini

[11] Patent Number: 5,567,011
[45] Date of Patent: Oct. 22, 1996

[54] CUSHION FOR ANATOMICAL SUPPORT, ESPECIALLY FOR THE LUMBAR AND CERVICAL REGIONS, TO FIT ONTO SEAT BACKS

[76] Inventor: Lorenza Sessini, Via Caimi, 32, Vailate (Cremona), Italy

[21] Appl. No.: 241,733

[22] Filed: May 12, 1994

Related U.S. Application Data

[63] Continuation-in-part of Ser. No. 917,060, Jul. 30, 1992, Pat. No. 5,335,965.

[30] Foreign Application Priority Data

Mar. 9, 1990 [IT] Italy ...................................... 19632/90

[51] Int. Cl.⁶ ..................................................... A47C 3/25
[52] U.S. Cl. ..................................... 297/284.7; 297/284.4
[58] Field of Search ............................ 297/463.1, 284.1, 297/284.4, 284.7, 284.8

[56] References Cited

U.S. PATENT DOCUMENTS 5,217,278   6/1993   Harrison et al. ...................... 297/284.4
5,314,236   5/1994   Suzuki et al. ...................... 297/284.4 X

*Primary Examiner*—Milton Nelson, Jr.
*Attorney, Agent, or Firm*—Michael J. Striker

[57] ABSTRACT

Cushion (50) for anatomical support, especially of the lumbar and cervical regions, for mounting onto backs (42) of seats (41) generally, includes a curved elastic plate (51) having longitudinal ends connected by a posterior brace formed by a pair (55, 60) of rods threaded in opposite directions and screwed into an intermediately placed cylindrical scroll (63) so that it is possible to vary the convexity of the plate (51) and therefore the extent to which the cushion projects from the seat back (42) by rotation of the scroll (63) in one direction or the other. It is also possible to adjust the height of the cushion, when placed inside the seat back (42), by a special internal mechanism (51, 71, 72, 74) operated by a knob (45) placed on the outside. Furthermore, an electric ratio motor can be provided to drive the cylindrical scroll rotatably. A three position switch can be connected between a source of power and the ratio motor to drive the motor in either of two rotation directions or not at all.

5 Claims, 7 Drawing Sheets

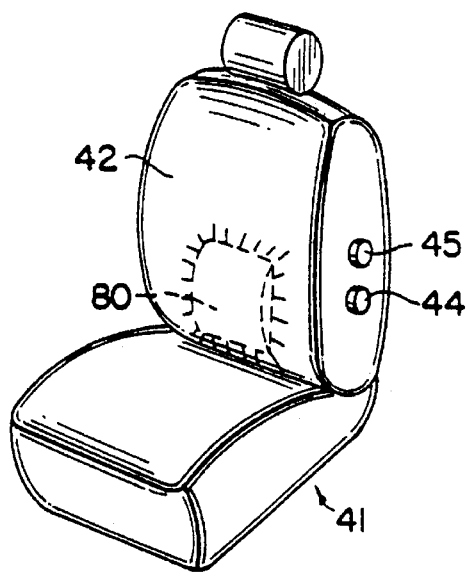
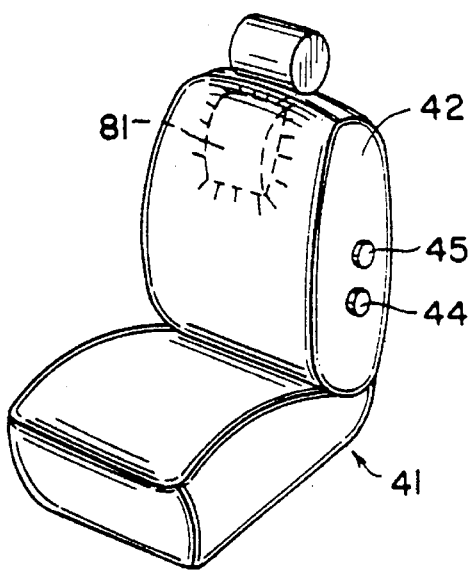
FIG.6  FIG.7
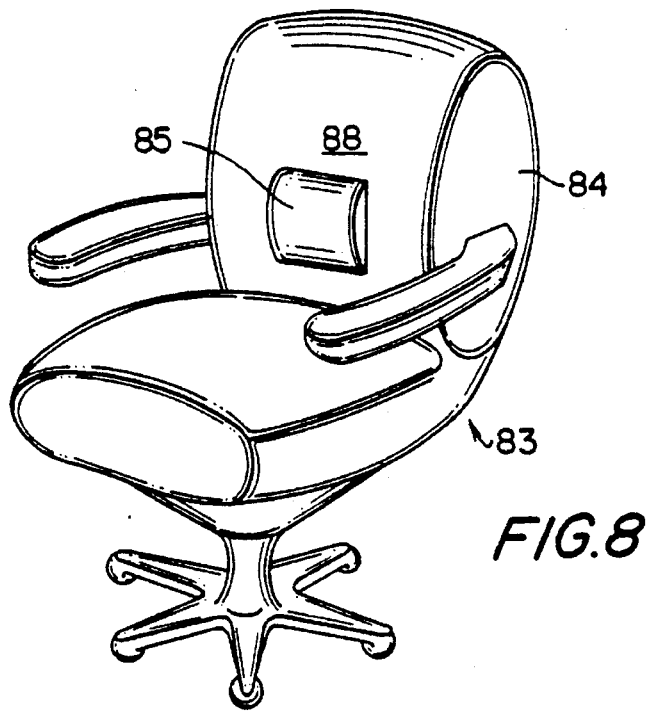
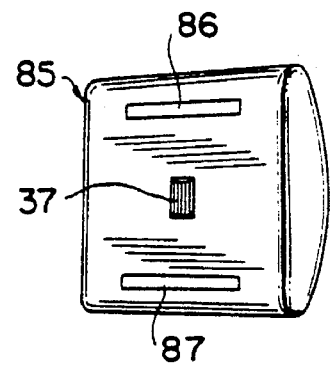
FIG.8  FIG.9

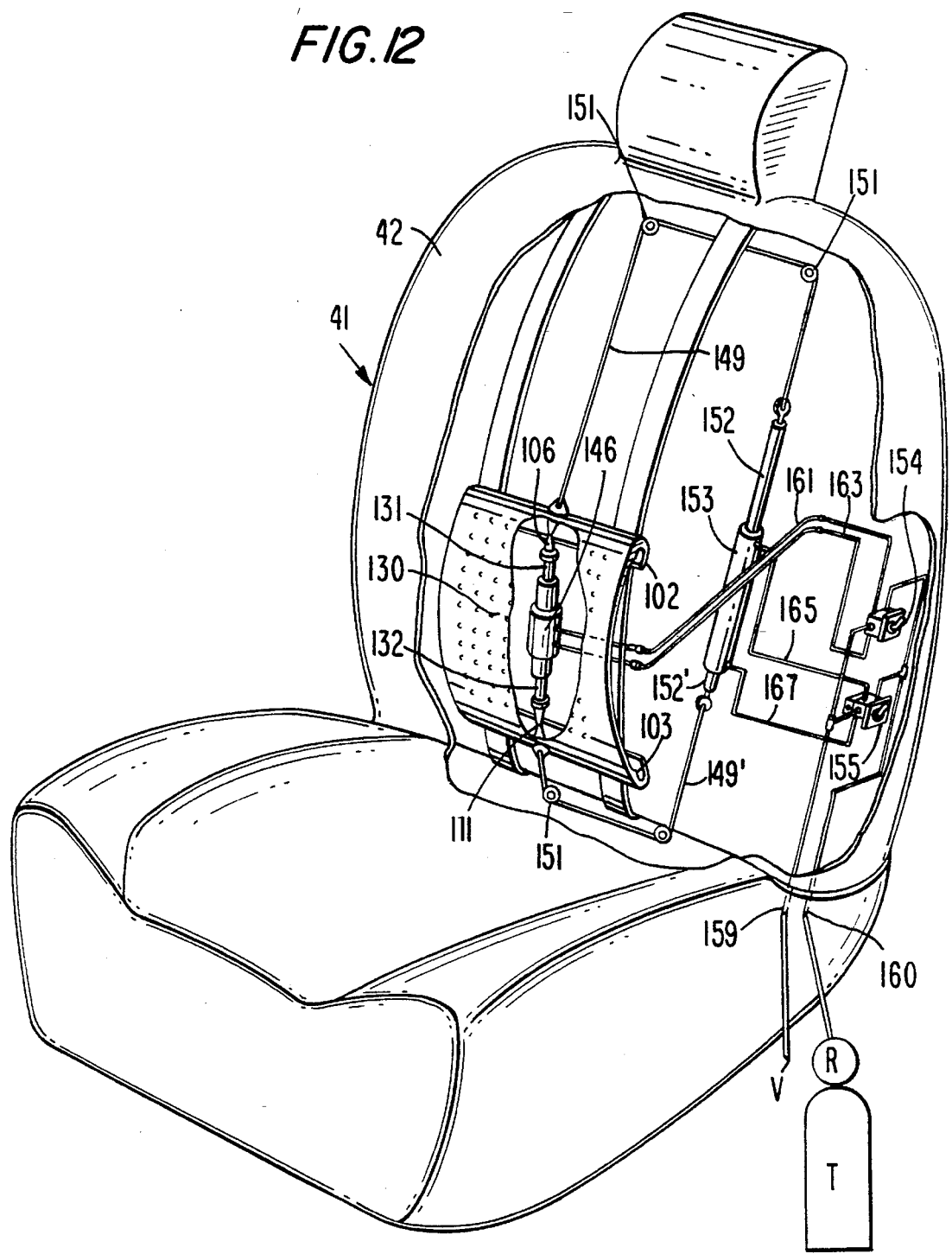

5,567,011

CUSHION FOR ANATOMICAL SUPPORT, ESPECIALLY FOR THE LUMBAR AND CERVICAL REGIONS, TO FIT ONTO SEAT BACKS

This is a continuation-in-part of U.S. patent application Ser. No. 07/917,060 filed Jul. 30, 1992, now U.S. Pat. No. 5,335,965.

BACKGROUND OF THE INVENTION

The invention relates to adjustable devices for anatomical support, especially cushions for the lumbar and cervical regions, to be mounted in or on the backs of seats, particularly vehicle seats, and, more particularly, to powered devices of this type for anatomical support.

Small cushions or seat backs which have some degree of adjustability are well known for lumbar and cervical support and are placed inside the seat backs of motor vehicles. The thickness and therefore outward projection can be varied to suit the needs or preferences of the user. These cushions of the prior art include a rigid structure combined with an elastic structure. Adjustment of the convexity of the elastic structure in relation to the rigid structure can be obtained by a system of cams with a tie rod. The cam can be operated from outside the seat by a mechanism including a gear wheel and worm screw and a transmission shaft worked by an external knob.

The external structure of the cushion can consist of longitudinal metal bands crossing over transversal bands with outwardly projecting ends to ensure adequate spring. This device is comparatively complex and its outer surface is rough and sharp. It must therefore be covered with a soft layer of considerable thickness. When the tie rod referred to above is part of a mechanism for changing the curvature of the elastic structure, a considerable effort is required to operate the cam. A worm screw can be used to lessen the effort involved in adjusting the device, but the adjusting knob must be given a great many turns so that the adjustment time is far too long.

Some of the above-described prior art devices which adjust the seat back convexity cannot be moved vertically from the lumbar to the cervical region or in between, or adapted to the stature, needs and preferences of the user.

These drawbacks lessen the advantages of these devices not only because of their cost, but also for practical reasons and duration.

SUMMARY OF THE INVENTION

It is the object of the present invention to provide an adjustable cushion, to support the lumbar-cervical regions of the back, having a simplified structure and operation in comparison to the adjustable cushions and seat backs of the prior art.

It is also an object of the present invention to provide an adjustable cushion for support of the lumbar-cervical regions of the back which includes an improved mechanism for either electrical or hydraulic powered adjustment of the cushion convexity to fit the back.

It is also another object of the present invention to provide an adjustable cushion for support of the lumbar-cervical regions of the back which includes an improved mechanism for either electrical or hydraulic powered adjustment of the height of the cushion between the lumbar and cervical regions.

According to the invention, the adjustable cushion comprises a curved elastic plate having longitudinal ends curved backwards so as to form an upper channel and a lower channel and mountable on the back of a seat projecting convexly from the back; and means for adjusting a convexity of the curved elastic plate including a posterior vertical central brace consisting of a pair of aligned threaded rods having posterior ends and threaded in opposite directions and a cylindrical scroll means receiving the aligned threaded rods so that the posterior ends of the threaded rods are secured in the upper and lower channels so that the convexity of the curved elastic back can be varied by rotating the scroll means.

The convexity of the plate, and consequently thickness of the cushion and the extent to which it projects out from the surface of the seat back, can therefore be increased or decreased as desired by rotating the scroll one way or the other.

In a preferred manually operated embodiment the cushion is placed on the outside surface of the seat back while the outer surface of the scroll is knurled and can be turned by the fingers from the outside through a specially made aperture in the outer covering of the seat back.

At the two longitudinal ends of the curved elastic plate pairs of slits for fixing the cushion to the outside of the seat back, at the height preferred by the user, by vertical bands wound around the seat back and passing through the slits can be provided in the curved elastic plate.

In another manually operated embodiment the curved elastic plate is placed inside the seat back. The scroll means is connected to a first transversal shaft, projecting from the side of the seat back, by a bevel gear and a first universal joint. A first knob is fixed to the first shaft for adjusting plate convexity from the outside.

In another manually operated embodiment the curved elastic plate slides on vertical runners fixed to the frame of the seat back and its height inside the seat back is determined by a continuous cord fixed centrally between the two longitudinal ends of the plate. The cord passes over the transmission rollers which are mounted at top and bottom of the seat back and roll freely, and they the cord winds onto a drum of a second transversal shaft, supported by the seat back, projecting from the side of the seat back and terminating in a second knob for purposes of adjustment. The scroll means is connected to the first transversal shaft and knob by the first and second universal joint connected by an intermediate shaft.

It is advantageous to have the intermediate shaft made in two pieces both axially free but rotating together.

In another type of embodiment in which the convexity adjusting mechanism is electrically powered, the scroll means is connected by a pair of bevel gears, or some other means, to an electric ratio motor. The ratio electric motor is operated by an electric power source, e.g. a battery, via a three-position switch which can be placed, for example, on the side of the seat back. In one switch position the current flows in one direction through the motor so that the ratio motor rotates the scroll means in one rotation direction, while in another switch position the current flows in another direction so that the ratio motor rotates the scroll means in an opposite rotation direction. The third switch position disconnects the ratio motor from the electric power so that the convexity of the plate remains constant. In this embodiment of course the universal joints and tie rods for mechanical connection of a knob on the side of the seat back and the bevel gears are omitted.

Similarly, in the above embodiment or another similar powered embodiment, the drum, on which a cord winds to vary as desired the height of the plate in relation to the seat back, is connected to another electric ratio motor and supplied with power via another three-position switch for rotation in one direction or the other. The ends of the cord which pass over transmission rollers are advantageously attached to the longitudinal ends of the curved elastic plate. Thus if the electric ratio motor is rotated one way via the switch the plate moves up on the seat back, while if it rotates the other way the plate moves down. When thee switch is in a third neutral position the drum does not rotate and thus the vertical position of the cushion on the seat back remains constant.

In other advantageous embodiments of a cushion including a powered mechanism for adjusting its convexity and/or vertical height on the seat back, the source of power can either be pneumatic or hydraulic. The scroll means can be replaced by a double acting cylinder with pistons slidably mounted in opposite ends. Either a source of compressed air or hydraulic fluid can be connected to the cylinder via a three-way valve. In one position of the three-way valve compressed air or hydraulic fluid is supplied to the cylinder so that the pistons extend and since their piston rods are fixed in the longitudinal ends of the curved elastic plate, the elastic plate convexity is reduced. In another position of the three-way valve the piston rods are drawn into the cylinder and the convexity of the elastic plate is increased. A third position of course provides a neutral position in which the convexity of the plate remains constant.

A similar mechanism can be provided for adjustment of the vertical position by powered hydraulic or pneumatic means. Another double chambered hydraulic cylinder is provided with pistons slidably mounted in respective chambers in opposite ends of the cylinder. The ends of the piston rods are connected via a cord segment with respective longitudinal ends of the curved elastic plate and the cord segments are guided over transmission rollers. The chambers of the cylinder are connected to a source of compressed air or hydraulic fluid via another three-way valve. In one position of the three-way valve the structure of the valve and the cylinder is such that one of the pistons extends while the other retracts the same amount into the cylinder so that the plate is displaced vertically in one direction. When the three-way valve position is changed to another active position the plate is displaced in another direction. In a third neutral position of the valve the plate does not move vertically.

The adjustable cushion according to the invention can be used in particular for office seats or armchairs, for seats in cinemas, conference rooms or stadiums, for seating in coaches, aeroplanes or motor vehicles, for means of transport generally for persons and goods.

BRIEF DESCRIPTION OF THE DRAWING

The objects, features and advantages of the present invention will now be illustrated in more detail by the following detailed description, reference being made to the accompanying drawing in which:

FIGS. 6–7, are perspective views of the vehicle seat and cushion for anatomical support shown in FIG. 5 with the cushion in two positions on the seat back;

FIG. 8 is perspective view of an office armchair and a fourth embodiment of a cushion for anatomical support of the lumbar-cervical regions according to the invention mounted with cushion Velcro-type (hooks-loops connection) strips on the outside the chair back;

FIG. 9 is a rear perspective view of the cushion for anatomical support shown in FIG. 8;

FIG. 12 is a cutaway perspective view of a vehicle seat and a seventh embodiment of the cushion for anatomical support of the lumbar-cervical region according to the invention mounted inside the seat back showing a pneumatically or hydraulically powered cushion adjusting mechanism used in this embodiment.

DESCRIPTION OF THE PREFERRED EMBODIMENT

Figure 1:
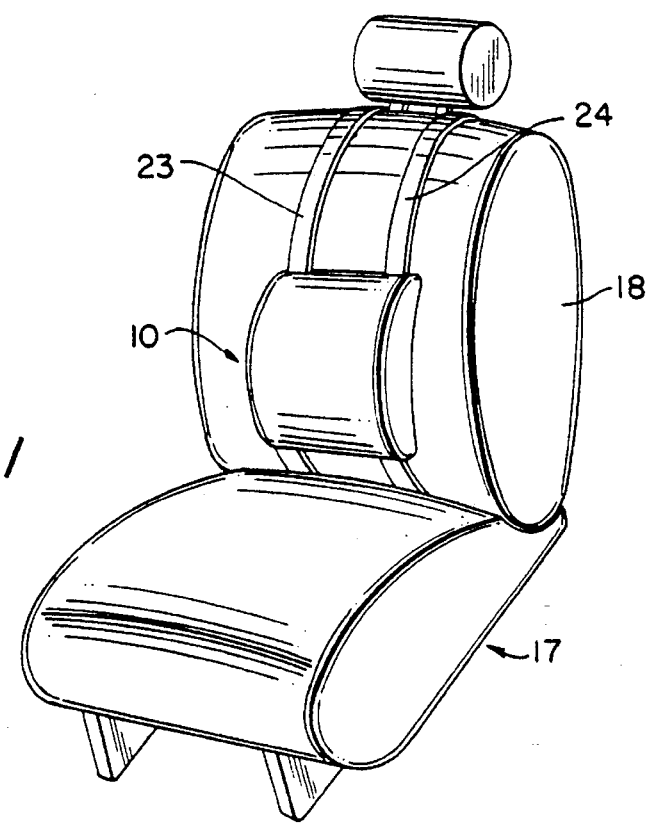
FIG. 1 is a perspective view of a motor vehicle seat and a first embodiment of a cushion for anatomical support of the lumbar-cervical regions according to the invention mounted on the outside of the seat and held in place by two bands.
Figure 3:
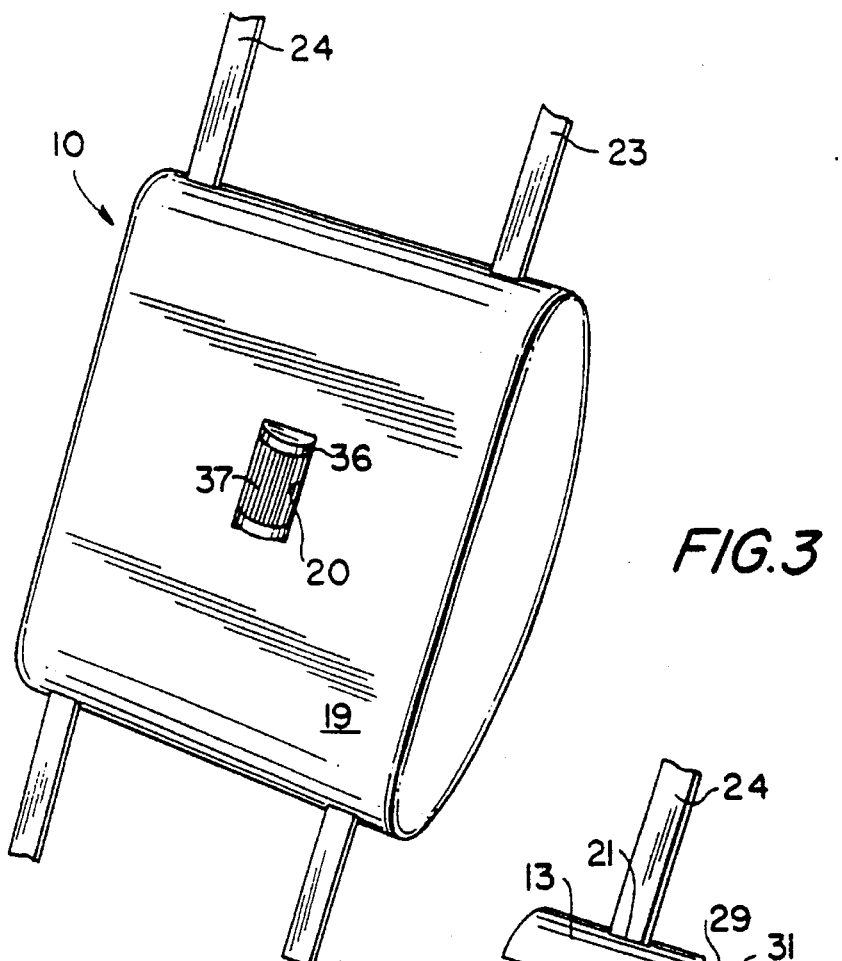
FIG. 3 is a rear perspective view of the cushion shown in FIG. 1.
Figure 4:
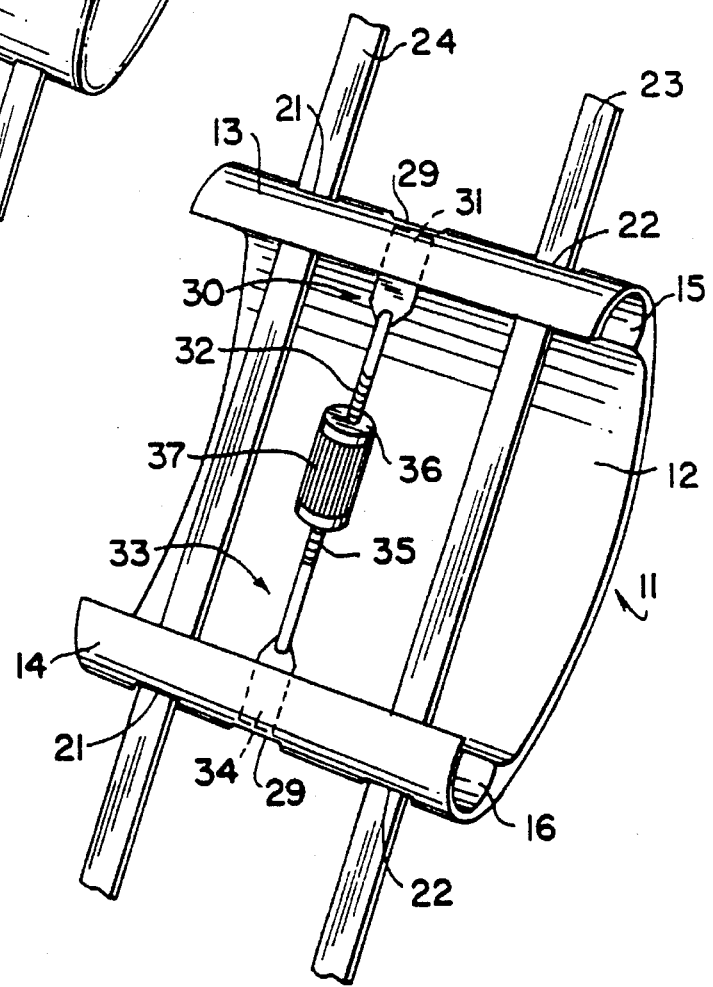
FIG. 4 is a rear perspective view of the cushion of FIG. 1 with the back of the cushion removed to show the internal adjusting mechanism of the cushion shown in FIG. 1.

The cushion 10 (FIGS. 1, 3, 4) includes a device 11 comprising an elastic plate 12 with an upper end 13 and a lower end 14 curved back to form channels 15 and 16.

The upper and lower ends 13 and 14 contain the pairs of slits 21 and 22 through which the bands 23 and 24 pass respectively, for holding the cushion 10 to the back 18 of the motor vehicle 17.

The cushion 10 can of course be placed on the seat back at different heights by sliding it up or down the bands 23 and 24.

A brace including a pair of aligned rods 30 and 33 is positioned on the vertical axis of symmetry of the plate 12. The top end 31 and lower end 34 of the rods are fixed to the plate 12 in the inside channels 15 and 16 of the plate 12, while rod ends 32 and 35, threaded in opposite directions, screw onto the cylindrical threaded scroll 36 with an externally knurled surface 37. An aperture 20 (FIG. 3) is made in the covering 19 over the cushion 10 to allow the fingers to work the scroll 36.

By rotating the scroll 36 the user can move the ends 13 and 14 of the plate 12 nearer or farther away from each other and thus increase or reduce the convexity of the cushion 10 and adjust the thickness of the cushion 10 to personal needs.

Figure 2:
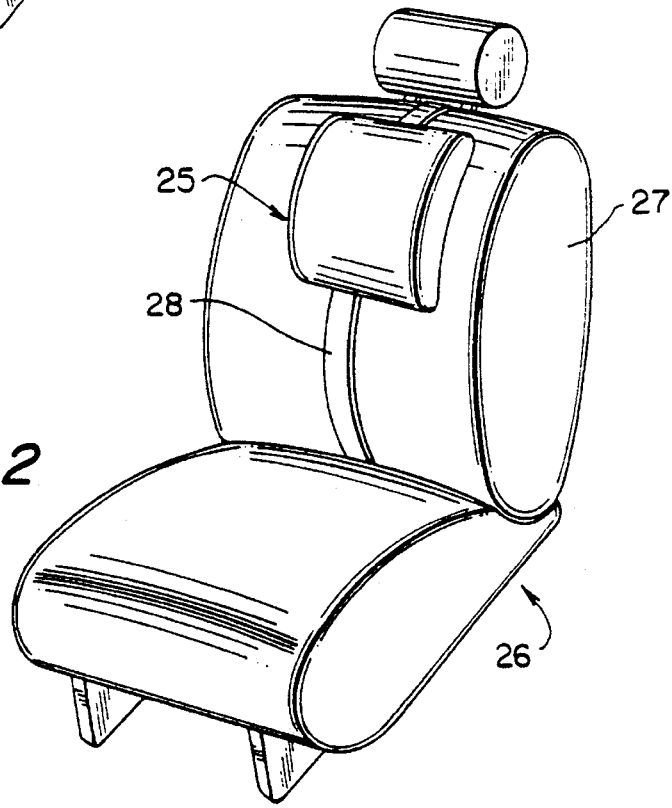
FIG. 2 is a perspective view of a motor vehicle seat and a second embodiment of a cushion for anatomical support according to the invention held in place on the seat by one bared only.

FIG. 2 shows another embodiment. In this embodiment a cushion 25, substantially the same as the cushion 10 already described, is fixed to the back 27 of the seat 26 by a single band 28 made to pass through the slits 29 (FIG. 4) cut in the plate 12.

Figure 5:
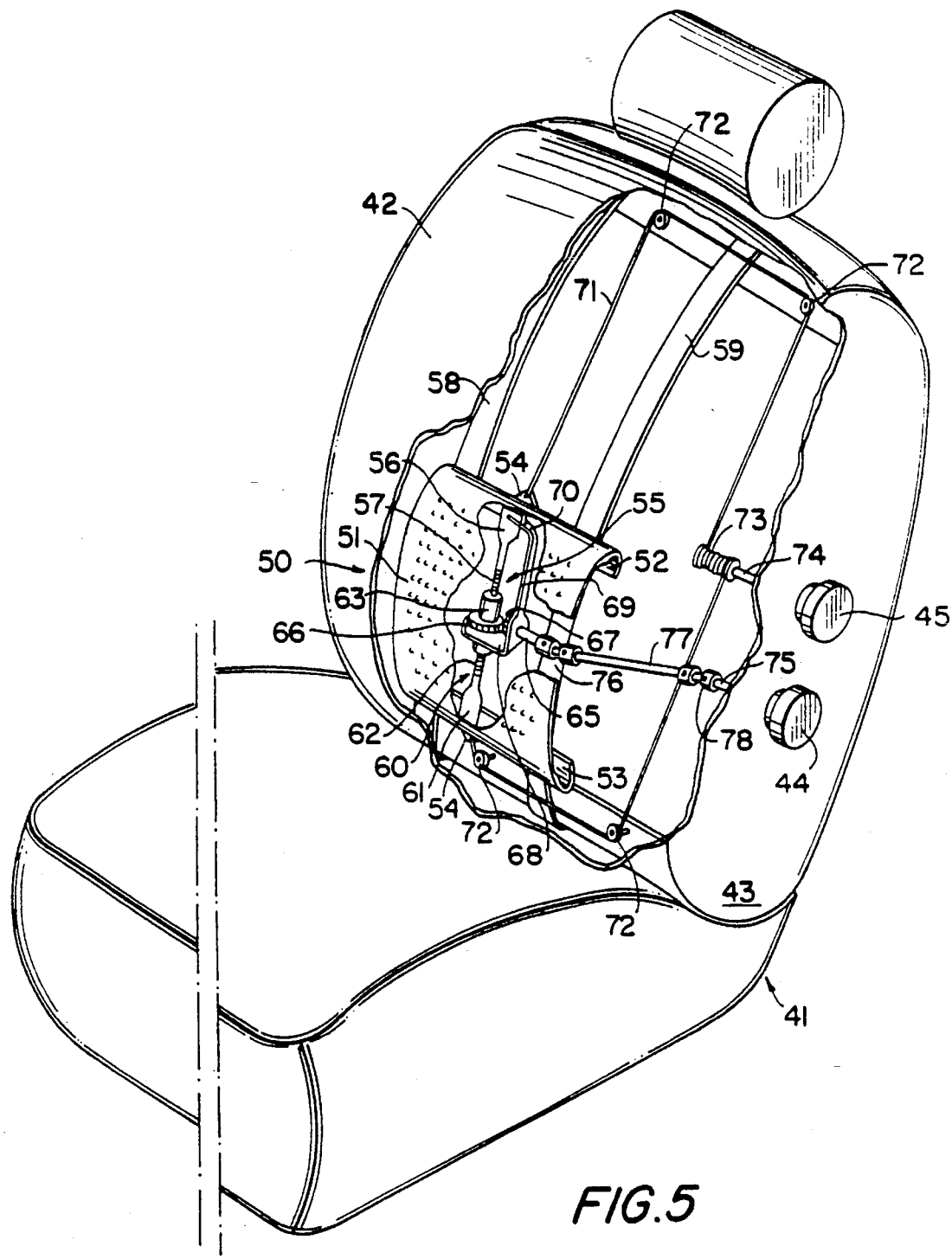
FIG. 5 is a cutaway perspective view of a vehicle seat and a third embodiment of the cushion for anatomical support of the lumbar-cervical regions according to the invention mounted inside the seat back, with the seat cover for the seat back removed to show the adjusting mechanism used in this embodiment.

FIGS. 5, 6 and 7 show a third embodiment of a cushion 50 for supporting the lumbar-cervical regions according to the invention, similar to cushions 10 and 25 already described, but placed inside the back 42 of the seat 41 for motor vehicles and visible in the cut-away in FIG. 5. The cushion 50 comprises an elastic plate 51, substantially the same as the plate 12 already described and seen in FIG. 4, and a pair of bracing rods, an upper one 55 and lower one 60.

The rods 55 and 60 have flat ends 56 and 61 fixed respectively to the upper and lower channel-shaped ends 52 and 53 of the plate 51, and the oppositely threaded ends 57 and 62 screwed into the cylindrical scroll 63.

The scroll 63 is mechanically connected to the short shaft 65 by the bevel gear 66–67. The bevel gear is held in place by the L-bar 68 whose rotation in relation to the gear wheel 66 is prevented by the rigid arm 69 with upper fork 70 into which is inserted the flat end 56 of the upper tie rod 55 mentioned above.

A bevel gear shaft 65 is mechanically connected to a first transversal shaft 75 which turns on supports fixed to the back 42 of the seat 41 (not seen in FIG. 5) by first universal joint 78 and second universal joint 76 at the opposite ends of the intermediate shaft 77.

The bevel gear shaft 65 referred to above can be worked externally from the side 43 of the back 42 by a first knob 44. Rotating the knob thus rotates the scroll 63 and therefore increases or reduces, as preferred, the convexity of the elastic plate 51 to obtain the same effect as given by manual rotation of the scroll 36 on plate 12 of apparatus 11 illustrated previously in FIG. 4.

The plate 51 can slide on vertical guides 58, 59 inside the seat back 42, the guides passing through slits cut into the plate 51.

Sliding movement is brought about by the continuous cord 71 fixed, at its two ends, to loops 54 placed top and bottom of the curved elastic plate 51.

The cord 71 passes over revolving transmission rollers 72 supported by the structure of the seat back 42 and winds round the drum 73 of a second shaft 74 that extends from a second knob 45 projecting from the side 43 of the seat back.

Therefore, by turning the second knob 45, plate 51 can be moved up and down to the position preferred by the user.

The movement is made possible by first and second universal joints 76 and 78 that give shaft 77 the flexibility necessary so that the shaft 77 can assume different angular positions and the plate 51 can move.

In FIGS. 6 and 7, numbers 80 and 81 mark the extreme positions that the internally mounted cushion according to the invention can reach by turning the second knob 45.

FIGS. 8 and 9 illustrate another embodiment of the cushion 85 according to the invention, similar to cushions illustrated in FIGS. 1–4, which is releasably attached to the back 84 of an office armchair 83 by Velcro-type strips 86,87 that cling to the covering 88 of suitable composition.

This means of application can obviously also be used on the seat backs of motor vehicle seats.

Figure 10:
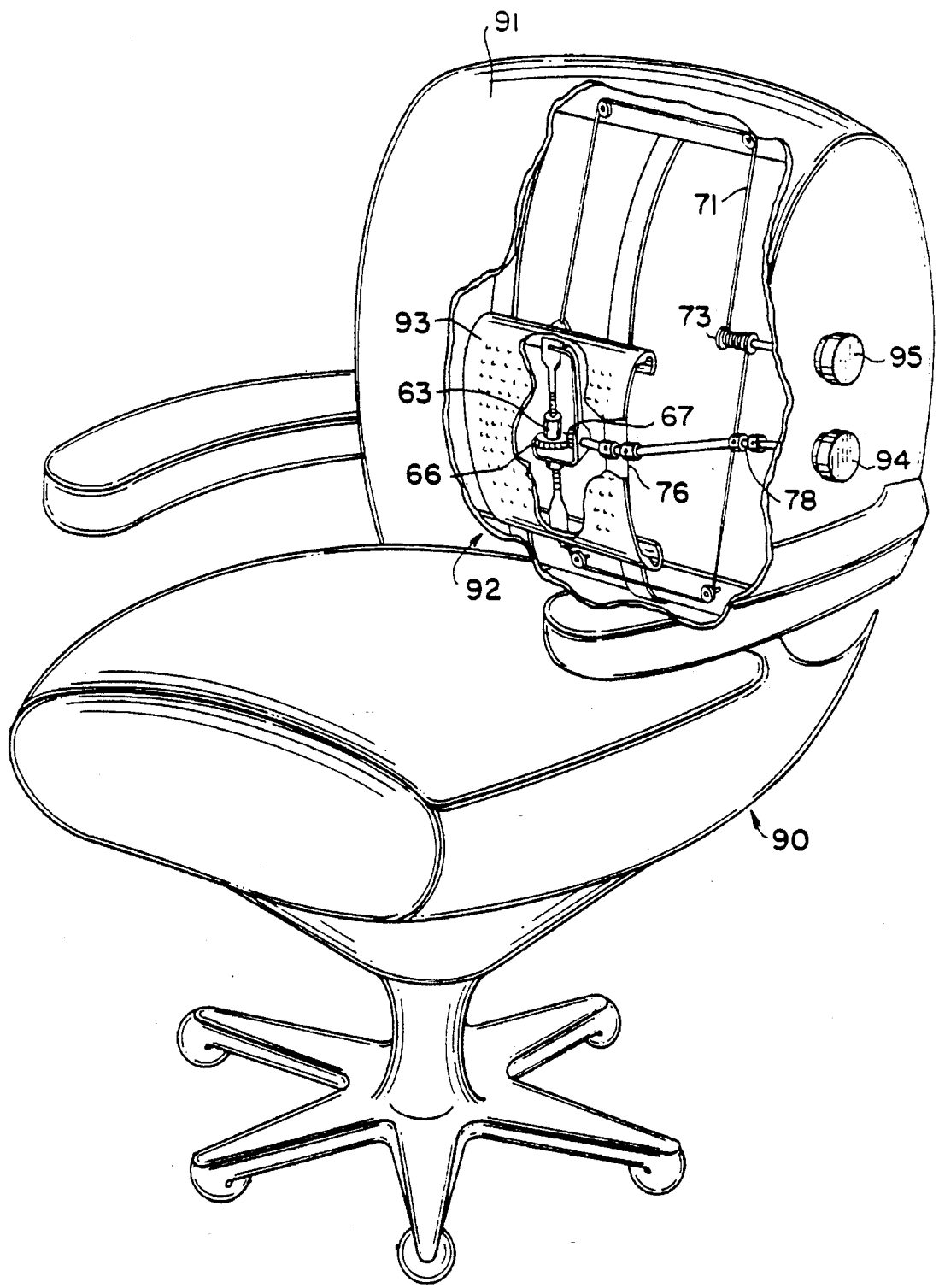
FIG. 10 is a cutaway perspective view of an office armchair and a fifth embodiment of a cushion for anatomical support of the lumbar-cervical region according to the invention mounted inside the back, with the seat back cutaway showing the adjusting mechanism for the cushion.

FIG. 10 illustrates another embodiment of the cushion according to the invention. A cushion 92 according to the invention, which is similar to cushion 50 already illustrated in FIG. 5, is mounted inside the back 91 of an office chair 90.

The plate 93 can be seen as well as the various mechanisms operated by second and first knobs 94 and 95 for respectively varying the convexity of the plate and for moving it vertical on the seat back.

Figure 11:
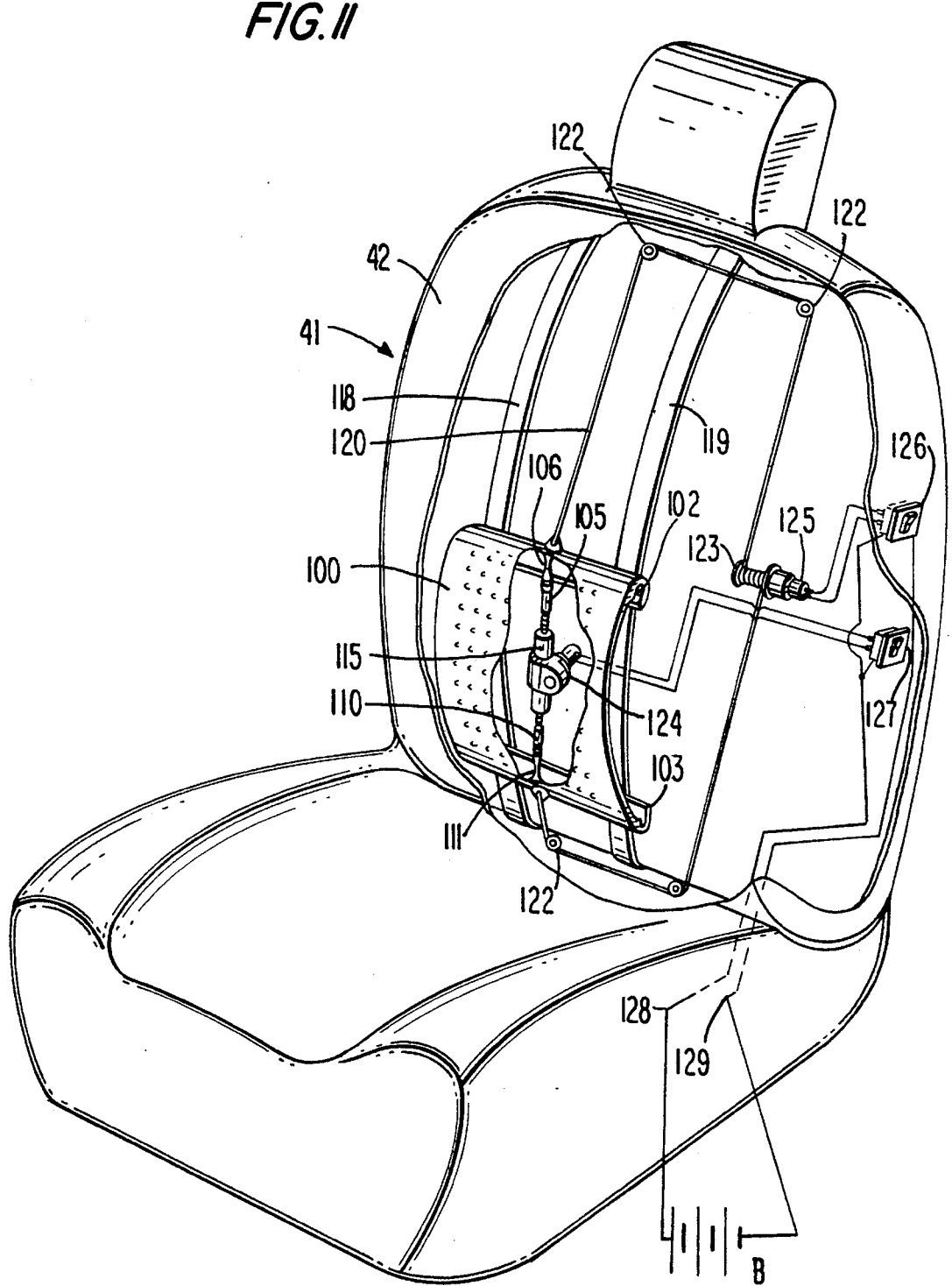
FIG. 11 is a cutaway perspective view of a vehicle seat and a sixth embodiment of the cushion for anatomical support of the lumbar-cervical region according to the invention mounted inside the seat back showing the motorized cushion adjusting mechanism used in this embodiment.

FIG. 11 shows a sixth powered embodiment of an adjustable cushion for anatomical support of lumbar-cervical regions according to the invention which has a motorized electric drive means for raising and lowering the cushion as well as motorized electric drive means for adjusting its convexity.

The plate 100, similar to the plate 51 in FIG. 5, is connected at its upper end 102 and its lower end 103 by respective internal rods 106 and 111 to respective stays 105 and 110 which are threaded in opposite directions. The stays 105 and 110 are screwed into the two ends of a threaded scroll device 115 connected with an electric ratio motor 124 via bevel gears of the type shown in FIG. 5. The electric ratio motor 124 and the electric ratio motor 125 are supplied with direct electric current from battery B through wires 128 and 129 via respective three-position lever switches 127 and 126. These three-position lever switches are connected in parallel to the power lines 129 and 128 which are positively and negatively charged respectively.

The plate 100 is connected to the continuous cord 120 which is guided over the transmission rollers 122, which winds on the drum 123 which is connected to the electric ratio motor 125 which drives it in either of two directions rotatably. The electric ratio motor 125 is operated by the three-position switch 126. In a first position of the three-position switch 126, the ratio motor 125 is supplied with current flowing in one direction through the motor so that the drum 123 rotates in a first direction and winds up the cord 120 so that the plate 100 is either raised or lowered. In another second active position of the three-position switch 126 the plate 100 is mowed in an opposite direction to the first direction when the switch is in the other second position. The three-position switch 126 also has a third neutral position in which current is not supplied to the ratio motor 125 and the plate 100 is neither raised or lowered.

The convexity of the plate 100 can be changed by operating the three-position switch 127 which supplies the electric ratio motor 124 with current from battery B which rotates the stays 105 and 110 and thus changes the convexity of the plate 100. The direction of the convexity change depends on the position of the three-position switch 127. In a first position the ratio motor rotates in a direction which rotates the bevel gears to draw the stays 105 and 110 into the scroll 115 device in a similar manner to that in FIG. 5 and thus to increase the convexity of the plate 100 (since the stays are threaded and engage in threaded bores in opposite ends of the scroll device 115 when the scroll device is rotated in one direction or the other the stays which are fixed to the upper and lower longitudinal ends are either drawn into or forced out of the scroll device). In another active position of the three-position switch 127 different from the first position the ratio motor 124 rotates in the opposite direction, forces the stays out of the scroll device 115 and decreases the convexity of the plate 100. In a third neutral position the three-position switch 127 is set in a neutral position in which current is not supplied to the ratio motor and the convexity of the plate 100 does not change.

In FIG. 12 a seventh embodiment of an adjustable powered cushion for anatomical support of lumbar-cervical regions according to the invention which has a pneumatically or hydraulically powered drive means for raising and lowering the cushion as well as for adjusting its convexity is shown mounted on the vehicle seat 41 in the back 42 of the seat.

The plate 130 in this embodiment, which is similar to the curved plate 100 in the previous embodiment, is fixed at its upper end 102 and its lower end 103 by respective internal rods 106 and 111 to rods of the respective pistons 131,132 slidably mounted in the pneumatic or hydraulic cylinder 146. Pressurized air or hydraulic fluid is supplied to the cylinder 146 from the tank T via regulator or controlling valve R through the line 160 and is bled from the cylinder 146 over line 159. The lines 159 and 160 are directly connected in parallel to both three-position valves 154 and 155. The three-position valve 154 is connected by two lines 161 and 163 to the double acting cylinder 146 so that, when the three-position valve 154 is set in one position, pressurized medium is supplied over lines 161 and 163 to the double acting cylinder 146 and the pistons 131 and 132 are extended from both ends of the cylinder 146 making the plate less convex, but, when the three-position valve 154 is set in the opposite active position, pressurized medium is bled over lines 161 and 163 and through line 159 and out of the apparatus through the outlet V so that the pistons 131 and 132 are retracted into the cylinder 146 and make the plate 130 more convex. In the case of hydraulic fluid of course the hydraulic fluid can be collected and recycled by a pump. The middle position of the three-position valve 154 is neutral and pressurized medium is not supplied or withdrawn in that position so the convexity of the plate 130 remains the same.

The upper end of the plate 130 is connected by the cord 149, which passes over the transmission rollers 151 attached to the structure of the seat, to the upper end of the upper piston 152 slidably mounted in one chamber of the double chambered cylinder 153 and the lower end of the plate 130 is connected by the cord 149' to the lower piston 152' slidably mounted in the other chamber of the double chambered cylinder 153. A pressurized medium is supplied and withdrawn from the double chambered cylinder 153 by both lines 165 and 167 which are connected to the three-position valve 155. When the three-position valve 155 is in one position the pressurized medium (either pressurized air or hydraulic fluid) is bled from the cylinder 153 over line 167 and supplied over the line 165 so that the pistons 152 and 152' both move up and the plate 130 is moved down toward its extreme lower position. When the three-position valve 155 is in the other opposite position from the one position pressurized medium is bled over line 165 from the cylinder 153 and supplied over line 167 to the cylinder 153 so that the pistons 152 and 152' both move down and the plate 130 moves up toward its extreme upper position. The three-way valve 155 also has a neutral position between these two opposite active positions in which pressurized medium is neither supplied nor withdrawn and the plate 130 remains stationary.

The pressurized medium can be pressurized air when the device is pneumatically operated. A hydraulic fluid can be used when it is hydraulic.

The word "vertical" in the term "vertical central brace" means a longitudinal direction from the bottom of the seat back to the top of the seat back.

The curved elastic plate is located inside the seat back so that the "upper" channel is closer to the top end of the seat back than the bottom end and the "lower" channel is closer to the bottom end of the seat back and the vertical central brace extends between them.

I claim:
1. Adjustable cushion for anatomical support mountable on a back of a seat, said adjustable cushion comprising:
   a curved elastic plate having longitudinal ends, said longitudinal ends of said plate being curved backwards so as to form an upper channel and a lower channel and said elastic plate being mountable on said back of said seat projecting convexly from said back;
   means for adjusting a convexity of said curved elastic plate including a posterior vertical central brace consisting of a pair of aligned threaded rods having posterior ends and threaded in opposite directions and a cylindrical scroll means receiving said aligned threaded rods so that said posterior ends of said threaded rods are securable in said upper and lower channels and said convexity of said curved elastic plate can be varied by rotating said scroll means; and
   an electric ratio motor connected to said scroll means to drive said scroll means rotatably.
2. Adjustable cushion as defined in claim 1, further comprising a source of electric current and a three-position switch, said three-position switch connecting said source of electric current to said electric ratio motor so that in a first position of said three-position switch said scroll means is rotated in one of two rotation directions, in a second position of said three-position switch said scroll means is rotated in another of said two rotation directions and in a third position of said three-position switch between said first and said positions said scroll means is not rotated.
3. Adjustable cushion as defined in claim 1, further comprising means for adjusting a vertical height of said curved elastic plate on said back including transmission rollers for mounting in said back of said seat, a continuous cord having cord ends and attached at said cord ends to respective ones of said longitudinal ends of said curved elastic plate, a drum around which said cord is wound and another electric ratio motor connected with said drum to drive said drum rotatably.
4. Adjustable cushion as defined in claim 3, further comprising a three-position switch, said three-position switch connecting a source of electric current to said other electric ratio motor so that in a first position of said three-position switch said curved elastic plate is moved in one of two vertical directions, in a second position of said three position switch said curved elastic plate is moved in another of said two vertical directions and in a third position of said three position switch between said first and said second position, said curved elastic plate is not moved at all.
5. Adjustable cushion for anatomical support mountable on a back of a seat, said adjustable cushion comprising:
   a curved elastic plate having longitudinal ends, said longitudinal ends of said plate being curved backwards so as to form an upper channel and a lower channel and said elastic plate being mountable on said back of said seat projecting convexly from said back;
   means for adjusting a convexity of said curved elastic plate including a posterior vertical central brace consisting of a pair of aligned threaded rods having posterior ends and threaded in opposite directions and a cylindrical scroll means receiving said aligned threaded rods so that said posterior ends of said threaded rods are securable in said upper and lower channels and said convexity of said curved elastic plate can be varied by rotating said scroll means; and
   electric motor means connected to said scroll means, to drive said scroll means rotatably.

* * * * *